(12) United States Patent
Tally et al.

(10) Patent No.: US 9,768,598 B2
(45) Date of Patent: Sep. 19, 2017

(54) LOAD BEARING SUPPORT SYSTEM (71) Applicant: Cooper Technologies Company, Houston, TX (US)

(72) Inventors: Brandon Michael Tally, Greenville, IL (US); Stephen Nathaniel Thompson, Edwardsville, IL (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 15/160,506

(22) Filed: May 20, 2016

(65) Prior Publication Data
US 2016/0322798 A1 Nov. 3, 2016

Related U.S. Application Data (63) Continuation of application No. 14/323,504, filed on Jul. 3, 2014, now Pat. No. 9,350,147.

(51) Int. Cl.
*E04B 1/58* (2006.01)
*H02G 3/04* (2006.01)
*H02G 3/06* (2006.01)
*F16L 3/26* (2006.01)
*E04B 1/24* (2006.01)

(52) U.S. Cl.
CPC .......... *H02G 3/0608* (2013.01); *E04B 1/5812* (2013.01); *F16L 3/26* (2013.01); *H02G 3/0437* (2013.01); *H02G 3/0456* (2013.01); *E04B 2001/2415* (2013.01); *E04B 2001/2457* (2013.01); *Y10T 403/75* (2015.01)

(58) Field of Classification Search
CPC .......... E04B 1/5812; E04B 2001/2415; E04B 2001/2445; E04B 2001/2448; E04B 2001/2457; H02G 3/0608; H02G 3/0406; H02G 3/0456; H02G 3/0437; Y10T 403/75
USPC ................. 52/837, 848, 655.1; 403/292, 298
See application file for complete search history.

(56) References Cited

U.S. PATENT DOCUMENTS

| 3,246,433 | A | * | 4/1966 | Eriksson | E04D 13/1415 403/292 |
| 3,521,843 | A | * | 7/1970 | Ogle | F16L 3/26 174/68.3 |
| 4,733,986 | A | * | 3/1988 | Kenning | E04B 1/5812 403/306 |
| 5,639,048 | A | * | 6/1997 | Bartholomew | F16L 3/26 248/49 |
| 6,313,405 | B1 | * | 11/2001 | Rinderer | H02G 3/0456 174/68.3 |
| 7,922,012 | B2 | | 4/2011 | Sisley | |
| 8,136,769 | B2 | | 3/2012 | Cardin | |
| 8,459,604 | B2 | | 6/2013 | Smith et al. | |
| 8,733,723 | B2 | | 5/2014 | Smith et al. | |
| 9,350,147 | B2 | | 5/2016 | Tally et al. | |

(Continued)

*Primary Examiner* — Ryan Kwiecinski
(74) *Attorney, Agent, or Firm* — Senniger Powers LLP (57) ABSTRACT A rail for a cable tray having opposite longitudinal ends includes a generally vertical web having opposite upper and lower ends, an upper flange at the upper end of the web, and a lower flange at the lower end of the web. A splice plate retention groove outboard of the vertical web and generally adjacent at least one of the opposite longitudinal ends of the rail is configured to receive a splice plate therein to facilitate positioning of the splice plate on the rail.

10 Claims, 5 Drawing Sheets

(56) References Cited

U.S. PATENT DOCUMENTS

| | | | |
|---|---|---|---|
| 2011/0013978 A1* | 1/2011 | Smith | H02G 3/0608 403/306 |
| 2011/0076094 A1* | 3/2011 | Cardin | F16L 3/26 403/309 |
| 2013/0272777 A1* | 10/2013 | Hayter | E06B 3/9645 403/205 |
| 2015/0001352 A1* | 1/2015 | Kellerman | H02G 3/0608 248/68.1 |
| 2016/0006227 A1* | 1/2016 | Tally | H02G 3/0608 248/49 |

* cited by examiner

LOAD BEARING SUPPORT SYSTEM

CROSS-REFERENCE TO RELATED APPLICATION

This application is a continuation of U.S. application Ser. No. 14/323,504, filed Jul. 3, 2014, the entirety of which is incorporated herein by reference.

FIELD OF THE DISCLOSURE

The present disclosure generally relates to a rail for a cable tray and a cable tray including the same.

BACKGROUND OF THE DISCLOSURE

Ladder-type cable tray is used by industry to support electrical cable. A length or section of ladder cable tray comprises a pair of side rails connected by cable-supporting rungs extending between the rails at intervals along the tray. Cable tray sections are spliced together using splice plates to form a cable tray run. Typically, upper and lower edge margins of each splice plate are fastened to rails of the adjacent cable tray sections using fasteners, such as bolts, inserted through respective aligned openings in the splice plate and rails. The locations of the fasteners with respect to the splice plates and the rails maintain the splice plate in engagement with the respective upper and lower margins of the corresponding rail.

SUMMARY OF THE DISCLOSURE

In one aspect, a rail for a cable tray having opposite longitudinal ends generally comprises a generally vertical web having opposite upper and lower ends, an upper flange at the upper end of the web, and a lower flange at the lower end of the web. A splice plate retention groove outboard of the vertical web and generally adjacent at least one of the opposite longitudinal ends of the rail is configured to receive a splice plate therein to facilitate positioning of the splice plate on the rail.

In another aspect, a cable tray generally comprises first and second cable tray sections disposed end-to-end so that a longitudinal end of the first cable tray section is adjacent a longitudinal end of the second cable tray section. Each cable tray section includes a pair of parallel rails having opposite longitudinal ends and forming sides of the corresponding cable tray section. Each rail comprises a generally vertical web having opposite upper and lower ends, an upper flange at the upper end of the web, a lower flange at the lower end of the web, and a splice plate retention groove outboard of the vertical web and generally adjacent at least one of the longitudinal ends of the rail. At least one splice plate is received in at least one pair of adjacent splice plate retention grooves of the first and second cable tray sections.

In yet another aspect, a method of assembling a cable tray generally comprises providing first and second cable tray sections having opposite longitudinal ends. Each cable tray section includes first and second parallel rails having opposite longitudinal ends and forming sides of the corresponding cable tray section. Each rail comprise a generally vertical web having opposite upper and lower ends, an upper flange at the upper end of the web, a lower flange at the lower end of the web, and a splice plate retention groove outboard of the vertical web and generally adjacent at least one of the longitudinal ends of the rail. The first and second cable tray sections are connected end-to-end using at least one splice plate. The step of connecting the first and second cable tray sections includes inserting the at least one splice plate into at least one pair of adjacent splice plate retention grooves of the first and second cable tray sections.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DRAWINGS

Figure 1:
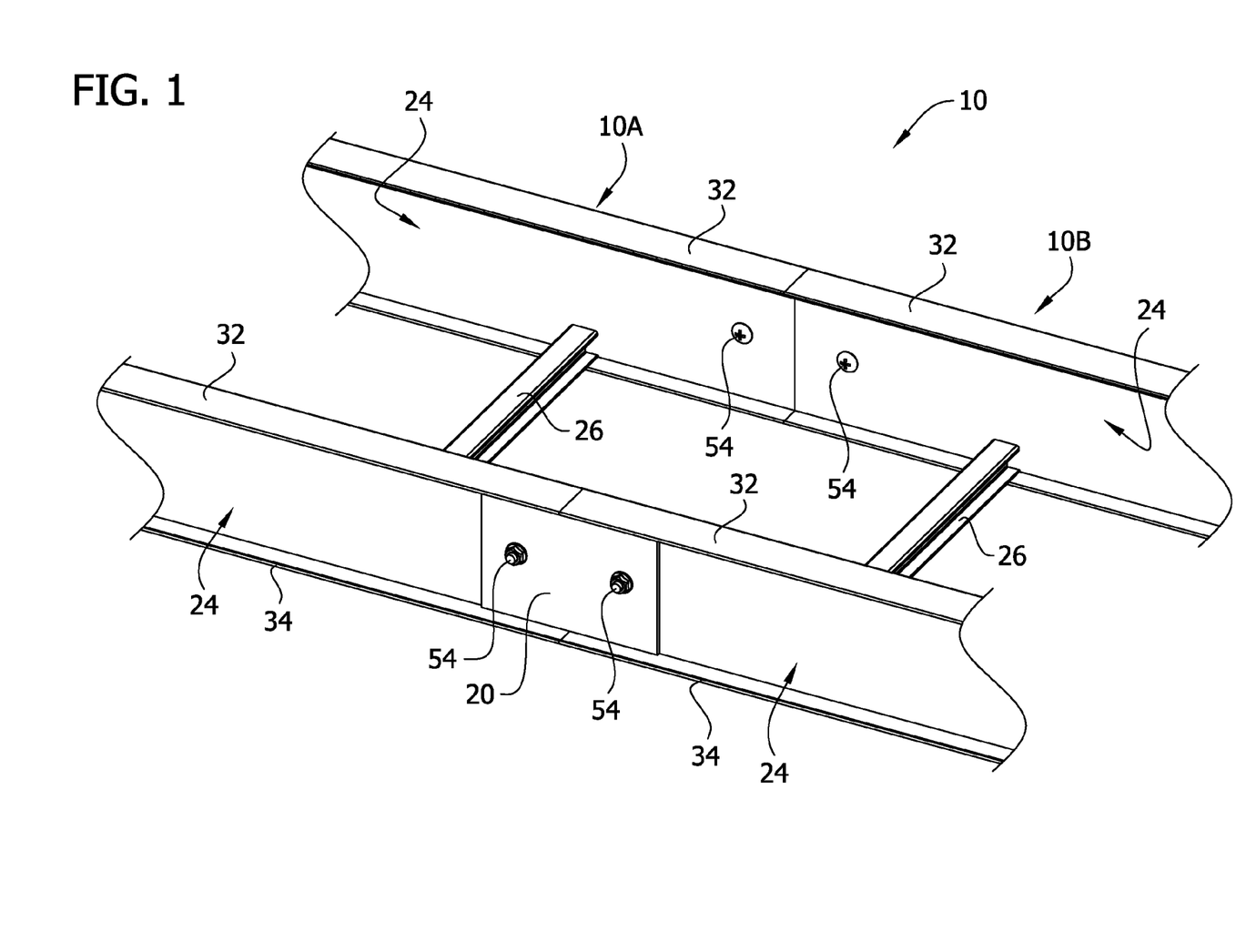
FIG. 1 is a partial perspective of one embodiment of a cable tray including a pair of cable tray sections connected by a pair of splice plates (only one splice plate is visible)
Figure 2:
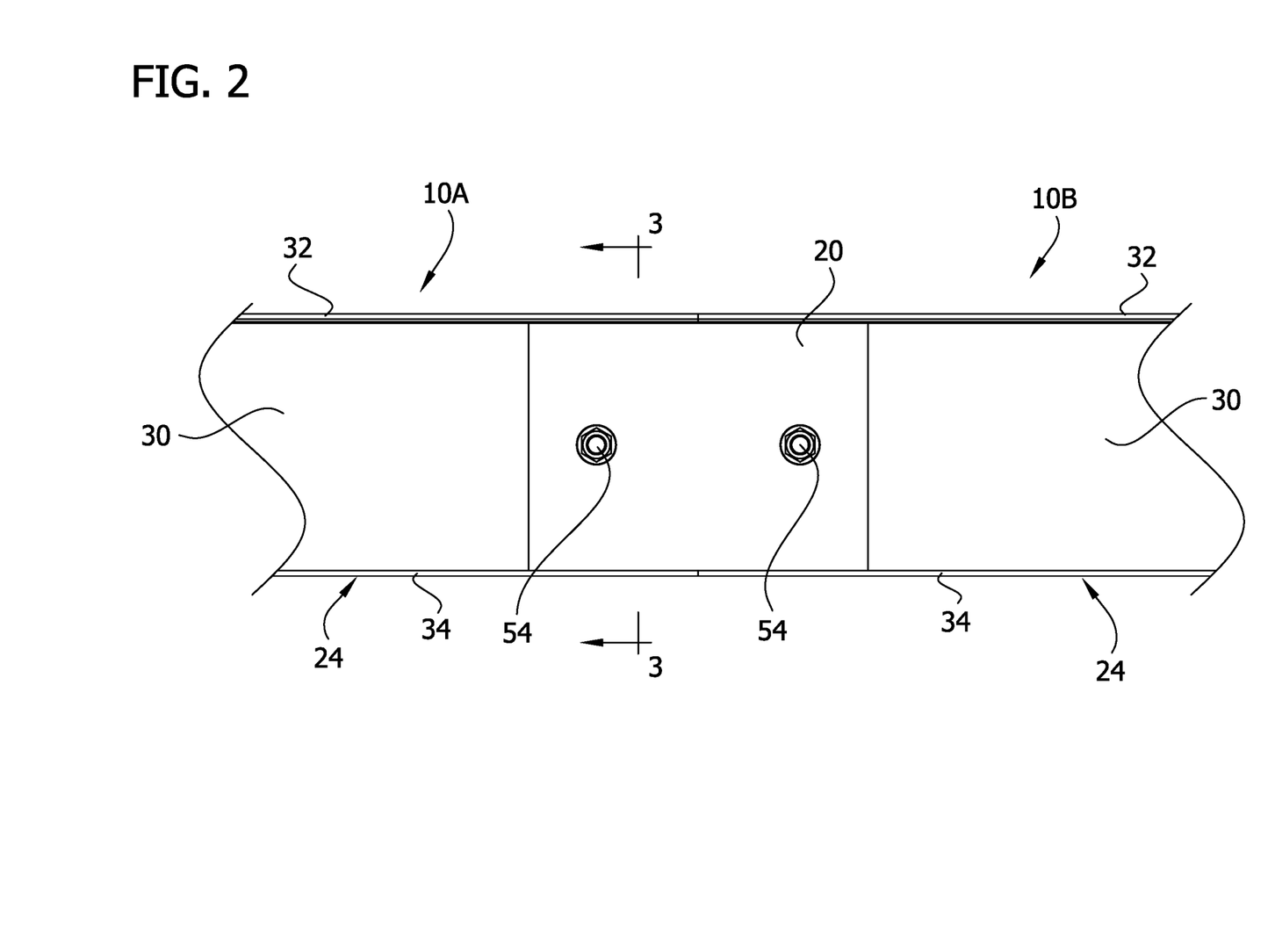
FIG. 2 is an enlarged, partial left elevation of the cable tray.

FIGS. 1 and 2 illustrate a cable tray, generally indicated at 10, including two cable tray sections, generally indicated at 10A, 10B, respectively, connected by two splice plates 20 (only one splice plate is visible in FIGS. 1 and 2). The cable tray 10 may include any suitable number of sections, and any suitable number of splice plates connecting the sections. Each cable tray section 10A, 10B includes two parallel rails, each generally indicated at 24, forming the sides of the cable tray section, and a plurality of cable-supporting rungs 26 extending between the rails at intervals spaced lengthwise of the section. Each rail 24 comprises a generally vertical web 30, a generally horizontal upper flange 32, at the upper end of the web, and a generally horizontal lower flange 34, at the lower end of the web. Each of the upper and lower flanges 32, 34 includes an outboard portion 32A, 34A, respectively, extending outboard from the vertical web 30, and an inboard portion 32B, 34B, respectively, extending inboard from the vertical web. The rungs 26 are secured (e.g., by welding or fasteners) to the inboard portions 34B of the lower flanges 34. Fastener holes 36 are provided (e.g., pre-drilled or drilled at the job site) in the vertical web 30 adjacent opposite longitudinal ends of the rails for use in connecting the cable tray sections 10A, 10B to one another via the splice plates 20, as will be described. In the illustrated embodiment, each rail 24 has one fastener hole 36 adjacent each of its ends, although the each rail may have any suitable number of holes and the holes may be formed at other locations in the rail, such as the flanges 32, 34. The length of each manufactured cable tray sections 10A, 10B may vary (e.g., from 10-30 feet). Sections are often cut to fit in the field to varying lengths.

Each rail 24 includes at least one splice plate retention channel or groove 40 sized and shaped for receiving (i.e., configured to receive) the splice plate 20 for use in attaching the splice plate the rail. In the illustrated embodiment, each rail 24 includes one plate retention groove 40 extending along substantially the entire length of the rail. In other embodiments, each rail 24 may include a first plate retention groove adjacent one of the end of the rail and a separate second plate retention groove adjacent the other end of the rail. In still other embodiments, each rail 24 may include a single plate retention groove adjacent only one of the ends of the rail and extending less than an entire length of the rail.

Figure 3:
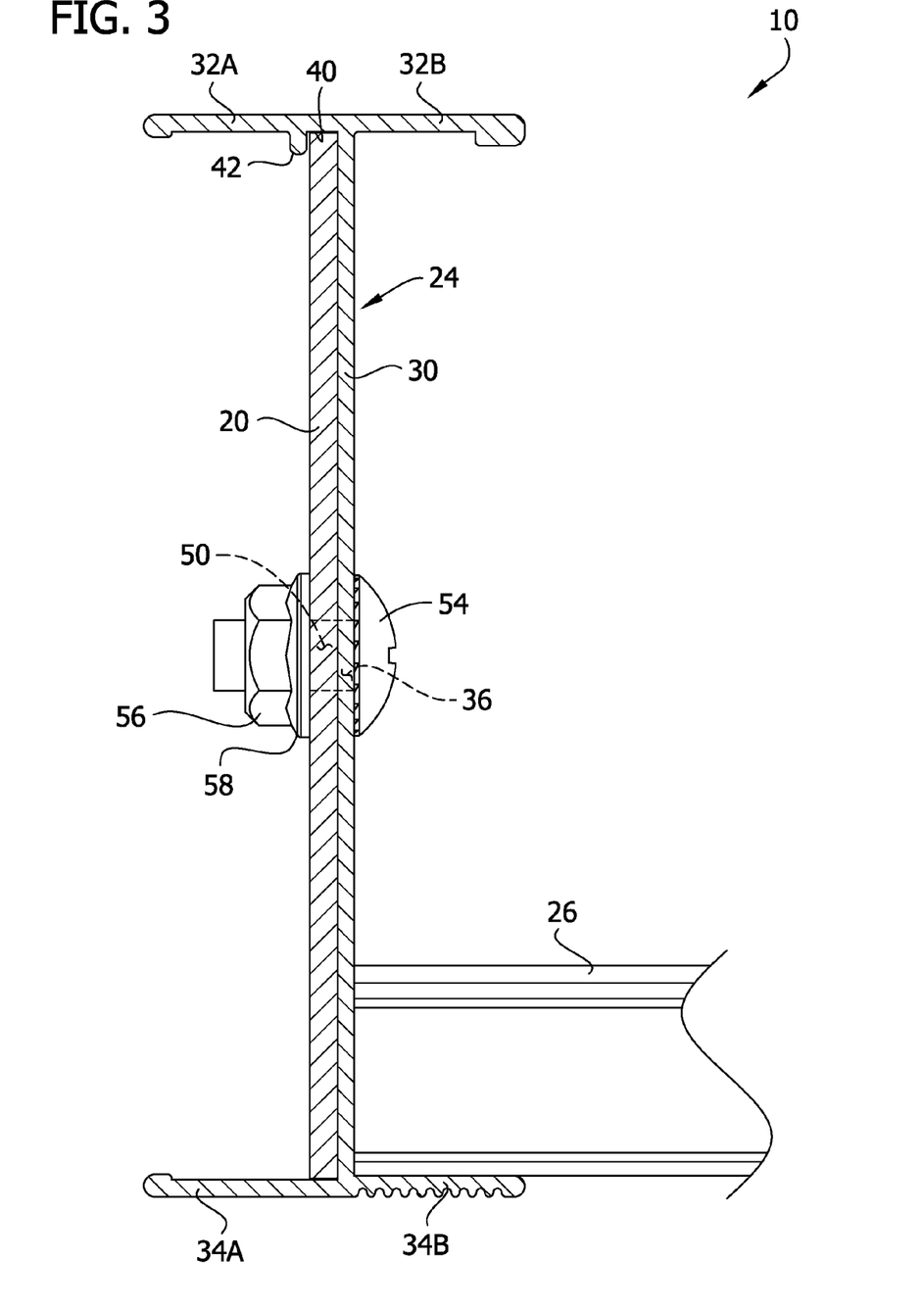
FIG. 3 is a fragmentary cross-section taken through the plane defined by the line 3-3 in FIG. 2.
Figure 4:
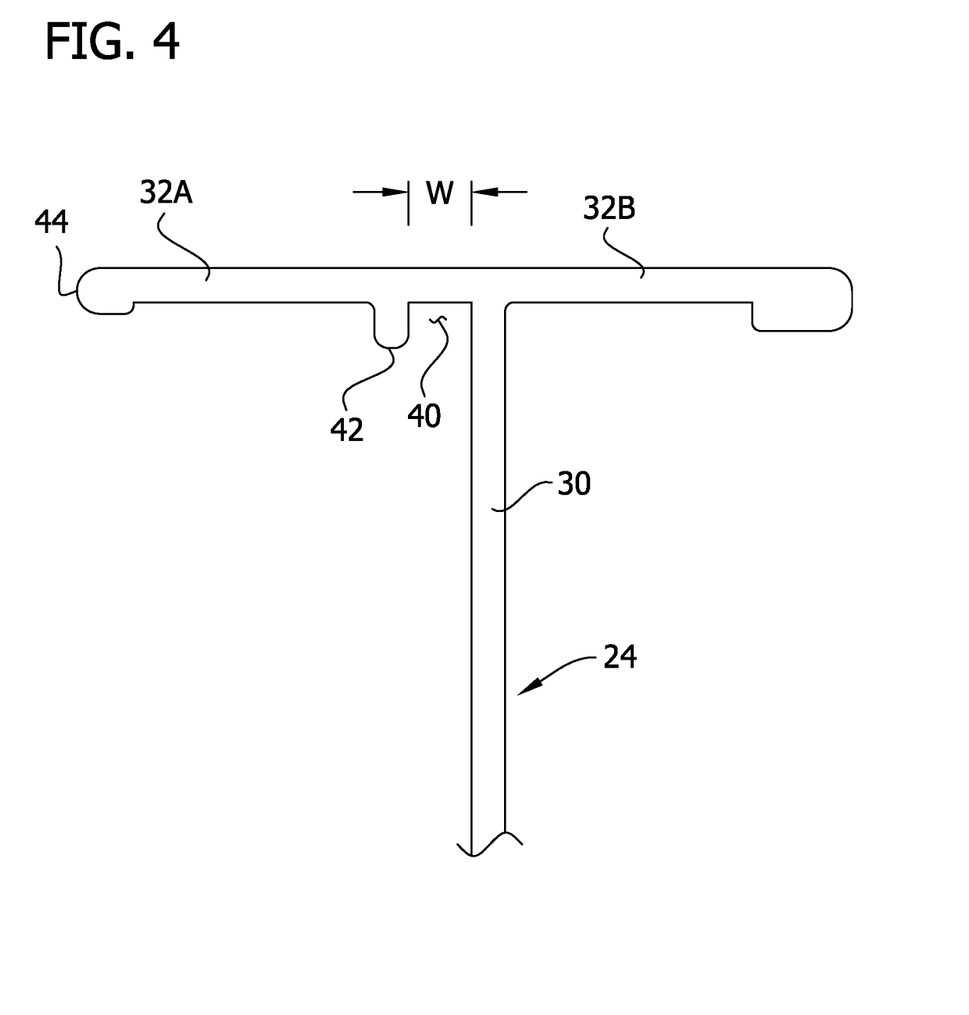
FIG. 4 is an enlarged, partial front elevation of one of the rails of the cable tray depicting a groove for receiving a splice plate.

Referring to FIG. 3, in the illustrated embodiment, the splice plate retention groove 40 is defined by an outer surface of the vertical web 30, an inner surface of the outboard portion 32A of the upper flange 32, and a rib 42 depending downward from the inner surface of the outboard portion of the upper flange at a location spaced a distance outboard of the vertical web to define a width W of the plate retention groove. Accordingly, the splice plate retention groove 40 is located outboard of the vertical web 30 adjacent the upper flange 32 and spaced inward (i.e., inboard) from an outboard terminal end 44 of the upper flange. The width W of the splice plate retention groove 40 may be slightly greater than a thickness of the splice plate 20 such that the splice plate is slidably receivable in the splice plate retention groove through one of the longitudinal ends of the plate retention groove and slidable lengthwise within the splice plate retention groove. Moreover, for reasons explained below, the width W of the splice plate retention groove 40 may be configured such that the rail 24 frictionally engages the splice plate 20 in the splice plate retention groove to inhibit free sliding movement of the splice plate in the groove. As an example, the width W of the splice plate retention groove 40 may be from about 0.05 in (1.27 mm) to about 0.20 in (5.08 mm) and in one example, about 0.11 in (2.80 mm). In general, the width W of the splice plate retention groove 40 may be any suitable dimension, depending on the desired thickness of the splice plate 20.

In other embodiments, the splice plate retention groove 40 or an additional plate retention groove may be located outboard of the vertical web 30 adjacent the lower flange 34 and spaced apart from an outboard terminal end of the lower flange. For example, a rib (not shown) may extend upward from the inner surface of the outboard portion 34A of the lower flange 34 at a location spaced a distance D from the vertical web 30, similar to the illustrated rib 42. The splice plate retention groove 40 may be formed in other ways without departing from the scope of the present invention.

In one example, the each rail 24 may be a single, integrally formed component. Each rail 24 may be formed by a suitable manufacturing process and may comprise any suitable material. By way of example, the rails 24 may be made from fiberglass. On the other hand, the rails 24 may be made from heavy-gage metal, for example, extruded aluminum, or it may be sheet steel bent into the shape of the rail. Other ways of forming the rails do not depart from the scope of the present invention.

Figure 5:
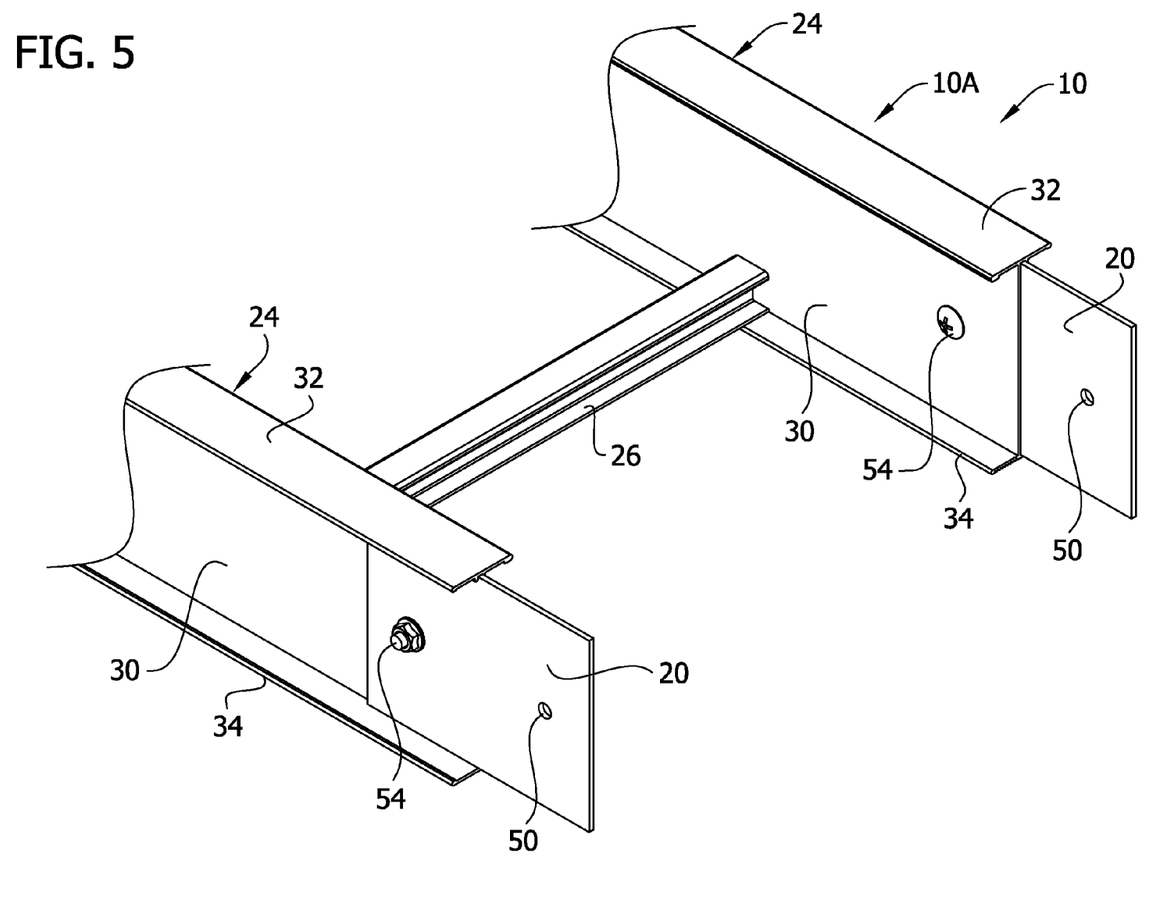
FIG. 5 is an enlarged perspective of splice plates received in the grooves of one of the cable tray sections.

Each splice plate 20 comprises a thin, generally planar body having a length suitable for spanning between the two cable tray sections 10A, 10B when the cable tray sections are positioned end-to-end, and a width suitable for substantially spanning the width of the vertical web 30 between the upper and lower flanges 32, 34. Each splice plate also has a thickness suitable for providing suitable rigidity and strength to the cable tray 10 at the splice location. In the illustrated embodiment, each splice plate 20 is provided with a pair of fastener holes 50 spaced apart from one another along the length of the plate. The fastener holes 50 are alignable with respective ones of the fastener holes 36 in the vertical webs 30 of the rails 24 when the splice plate is received in the respective plate retention grooves 40 of the end-to-end cable tray sections 10A, 10B. The illustrated splice plates 20 have circular fastener holes 50, although it is understood that the one or more of the fastener holes may have other shapes, such as oval or racetrack shapes for expansion splice plates, for example. Moreover, the splice plate 20 may have any number of suitable fastener holes 50 and the holes may be pre-drilled or pre-formed, or may be formed at the job site.

By way of example, the splice plates 20 may be made from fiberglass if used to connect fiberglass tray sections. On the other hand, the splice plates 20 may be made from heavy-gage metal if used to connect metal cable tray. The metal may be, for example, extruded aluminum, or it may be sheet steel bent into the shape of the splice plate. Other ways of forming the splice plates do not depart from the scope of the present invention.

An exemplary method of splicing the two sections 10A, 10B of the cable tray 10 to one another will now be described. Splice plates 20 (e.g., upper edge margins of the splice plates) are slidably inserted into the open ends of the splice plate retention grooves 40 of one of the tray sections, such as the first tray section as illustrated in FIG. 5. The splice plates 20 are positioned within the plate retention grooves 40 such that fastener holes 50 in the splice plates aligns with the respective fastener holes 36 in the vertical webs 30 of the rails 24. In this position, an exposed portion of each splice plate, including one or more fastener holes 50, extends outward from the longitudinal end of the corresponding rail 24 and cable tray section 10A. Next, the second cable tray section (e.g., tray section 10B) is positioned end-to-end with the first cable tray section 10A, during which the exposed portions of the splice plates 20 slidably enter the respective splice plate retention grooves 40 of the second cable tray section. With the splice plates 20 properly positioned on the cable tray sections 10A, 10B within the respective plate retention grooves 40, the splice plates are fastened to the cable tray sections using fastener assemblies. For example, a bolt 54 may be inserted through each of the aligned pairs of fastener holes 36, 50, and a nut 56 and washer 58 may be received on the bolt to attach the splice plates to the cable tray sections 10A, 10B.

When attached to the corresponding rails 24 of the abutting cable tray sections 10A, 10B, each splice plate 20 is received in the respective plate retention grooves 40 of the cable tray sections such that each splice plate is in generally face-to-face engagement with the vertical webs 30 of the corresponding rails. The edge margins of the splice plates 20 (e.g., the upper edge margins) are secured to the corresponding rails 24 within the plate retention grooves 40 and are inhibited from moving away from the vertical web 30. Additional cable tray sections may be connected to sections 10A, 10B, in the manner described above to form a cable tray run of the desired length.

As set described above, the width W of each plate retention groove 40 (and the thickness of each splice plate 20) may be dimensioned to form an interference fit between the upper edge margins (and/or the lower edge margin) of the splice plates and the cable tray sections 10A, 10B within the plate retention grooves 40 such that the splice plate does not freely slide within the splice plate retention grooves. Instead, some force is required to overcome the friction between the splice plate 20 and the cable tray sections 10A, 10B. In this way, the splice plate(s) 20 can be properly positioned on the cable tray sections 10A, 10B before fastening the splice plates to the cable tray sections, as described above. Alternatively, the splice plates 20 can be fastened to one of the cable tray sections (e.g., cable tray section 10A) before positioning the cable tray sections 10A, 10B end-to-end.

Another advantage provided by the plate retention groove 40 is its function of securing at least one of the upper and lower edge margins of each splice plate 20 to the corresponding cable tray sections 10A, 10B. By inhibiting the edge margin(s) of each splice plate 20 from moving away (e.g., outboard) from the vertical web 30, the splice plate supports the upper flange 32 and inhibits deformation thereof. Under heavy loading, the webs 30 of the rails 24 begin to deflect inwards towards the rungs 26, and the respective upper flanges 32 press downwards and against the upper edge margins of the splice plate 20. Without structure to keep the splice plate 20 against the web 30, the splice plate may separate from the web along an upper half of the rail profile. If that occurs, the flanges 32 will have nothing to support them or keep their profiles aligned, which can cause the flanges to deform or even rip off of the rails 24 at much lower loads than typically seen when contact between the splice plates 20 and the webs 30 are maintained. Accordingly, by inhibiting the edge margin(s) of each splice plate 20 from moving away (e.g., outboard) from the vertical web 30, the plate retention grooves 40 maintain the structure of the cable tray run during loading. As can be seen from FIG. 1, by incorporating the plate retention grooves 40, one fastening assembly, including one bolt, is suitable for securing the splice plate 20 to each rail 24. As set forth above, in conventional systems two bolts (i.e., an upper bolt and a lower bolt) secure the splice plate to each rail to maintain the upper and lower edge margins of the splice plate in contact with the webs. However, the additional bolts and fastening hardware are not necessary with the rails 24 because the plate retention grooves 40 maintain the upper edge margins of the splice plate 20 in contact with the respective webs 30.

It will be apparent that modifications and variations are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A load bearing support system comprising:
   first and second load bearing support sections disposed end-to-end so that a longitudinal end of the first load bearing support section is adjacent a longitudinal end of the second load bearing support section, each load bearing support section including
      a web having opposite upper and lower ends and a generally planar outboard face,
      an upper flange at the upper end of the web,
      a lower flange at the lower end of the web,
      a rib extending downward from the upper flange and spaced outboard from the web and inboard from an outboard terminal end of the upper flange, and
      a splice plate retention groove defined by the rib, the upper flange and the web and generally adjacent at least one of the longitudinal ends of the support section; and
   at least one generally planar splice plate, an upper edge margin of the generally planar splice plate is received in at least one pair of adjacent splice plate retention grooves of the first and second load bearing support sections, wherein the splice plate is in face-to-face engagement with the generally planar outboard face of the corresponding web, and the corresponding rib is configured to inhibit the upper edge margin of the splice plate from moving outboard of the web,
   wherein each of the load bearing support sections is free from a rib extending upward from the lower flange and being spaced outboard from the web and inboard from an outboard terminal end of the lower flange such that a lower edge of the generally planar splice plate is not received in a splice plate retention groove.

2. The load bearing support system set forth in claim 1, wherein the rib extends along substantially an entire length of the upper flange of the corresponding load bearing support section.

3. The load bearing support system set forth in claim 1, wherein the upper edge margin of the generally planar splice plate forms an interference fit with at least one of the rib, the portion of the upper flange, and the upper portion of the web.

4. The load bearing support system set forth in claim 1, further comprising fastener assemblies fastening the at least one generally planar splice plate to first and second load bearing support sections.

5. The load bearing support system set forth in claim 1, wherein widths of the splice plate retention grooves are slightly greater than a thickness of the splice plate.

6. The load bearing support system set forth in claim 5, wherein the widths of the splice plate retention grooves measure from about 0.05 in (1.27 mm) to about 0.20 in (5.08 mm).

7. A method of assembling a load bearing support system, the method comprising:
   providing first and second load bearing sections having opposite longitudinal ends, each load bearing section including a web having opposite upper and lower ends and a generally planar outboard face, an upper flange at the upper end of the web, a lower flange at the lower end of the web, a rib extending downward from the upper flange and spaced outboard from the web and inboard from an outboard terminal end of the upper flange, and a splice plate retention groove defined by the rib, the upper flange and the web and generally adjacent at least one of the longitudinal ends of the support section,
   connecting the first and second load bearing sections end-to-end using at least one generally planar splice plate, said connecting including inserting of the at least one generally planar splice plate into at least one pair of adjacent splice plate retention grooves of the first and second load bearing sections, wherein the splice plate is in face-to-face engagement with the outboard face of the corresponding web, and the corresponding rib is configured to inhibit the upper edge margin of the splice plate from moving outboard of the web,
   wherein each of the load bearing support sections is free from a rib extending upward from the lower flange and being spaced outboard from the web and inboard from an outboard terminal end of the lower flange such that a lower edge of the generally planar splice plate is not received in a splice plate retention groove.

8. The method of assembling a load bearing support system set forth in claim 7, wherein said connecting further includes retaining the at least one generally planar splice plate in the at least one pair of adjacent splice plate retention grooves of the first and second load bearing sections by an interference fit between the at least one generally planar splice plate and the first and second load bearing sections within the at least one pair of adjacent splice plate retention grooves.

9. The method of assembling a load bearing support system set forth in claim 7, wherein said connecting further includes fastening the at least one generally planar splice plate to the first and second load bearing sections using fastener assemblies.

10. The method of assembling a load bearing support system set forth in claim 7, wherein said inserting the at least one generally planar splice plate includes sliding the at least one generally planar splice plate into the at least one splice plate retention groove.

* * * * *